US008005232B2

(12) United States Patent
Roeck et al.

(10) Patent No.: US 8,005,232 B2
(45) Date of Patent: Aug. 23, 2011

(54) METHOD FOR ASSISTING A USER OF A HEARING SYSTEM AND CORRESPONDING HEARING SYSTEM

(75) Inventors: Hans-Ueli Roeck, Hombrechtikon (CH); Ivo Hasler, Winterthur (CH)

(73) Assignee: Phonak AG, Staefa (CH)

( * ) Notice: Subject to any disclaimer, the term of this patent is extended or adjusted under 35 U.S.C. 154(b) by 1325 days.

(21) Appl. No.: 11/556,712

(22) Filed: Nov. 6, 2006

(65) Prior Publication Data

US 2008/0107278 A1 May 8, 2008

(51) Int. Cl.
*H04R 29/00* (2006.01)
*H04R 25/00* (2006.01)
*G06F 11/00* (2006.01)
*H04B 17/00* (2006.01)

(52) U.S. Cl. ............ 381/60; 381/312; 714/46; 455/67.7

(58) Field of Classification Search .................... 381/58, 381/60, 105, 110, 312, 315, 324; 600/25, 600/559; 607/56, 57; 455/3.06, 414.3, 419, 455/67.11, 67.7, 115.1; 714/2, 25, 30, 45, 714/48–46
See application file for complete search history.

(56) References Cited

U.S. PATENT DOCUMENTS 4,049,930 A * 9/1977 Fletcher et al. ................. 381/60
5,721,783 A 2/1998 Anderson
6,322,521 B1 * 11/2001 Hou ............................. 600/559
6,774,795 B2 * 8/2004 Eshelman et al. ......... 340/573.1
2003/0138109 A1 7/2003 Bindner et al.
2004/0190738 A1 9/2004 Meier
2004/0208331 A1 10/2004 Chalupper
2005/0129262 A1 6/2005 Dillon et al.
2005/0227683 A1 * 10/2005 Draluk et al. ................. 455/419
2006/0223509 A1 * 10/2006 Fukazawa et al. ......... 455/414.3

FOREIGN PATENT DOCUMENTS

EP 1261235 A2 11/2002
EP 1628503 A2 11/2006
JP 2004187255 A 7/2005
WO 2004104761 A2 12/2004
WO 2006051346 A2 5/2006

OTHER PUBLICATIONS

International Search Report dated Feb. 26, 2007—PCT/EP2006/068099.

* cited by examiner

*Primary Examiner* — Curtis Kuntz
*Assistant Examiner* — Jesse A Elbin
(74) *Attorney, Agent, or Firm* — Pearne & Gordon LLP

(57) ABSTRACT

The hearing system comprises at least one request-receiving unit for receiving requests for assistance from a user of said hearing system and an assistance unit operationally connected to said request-receiving unit adapted to carrying out an assistance function providing assistance for said user. Preferably, said assistance unit is adapted to carrying out an analysis of a current status of at least one device of said hearing system. Preferably, said assistance unit is furthermore adapted to attempting to correct said current status if a faulty or inappropriate current status has been detected. Preferably, the hearing system comprises a communication interface, wherein said assistance unit is adapted to attempting to establish a communication link to a remote assistance provider using said communication interface. The method for assisting a user of a hearing system, comprises the steps of a) receiving a request for assistance from said user by means of a request-receiving unit of said hearing system; and
b) automatically carrying out an assistance function upon step a).

20 Claims, 2 Drawing Sheets

METHOD FOR ASSISTING A USER OF A HEARING SYSTEM AND CORRESPONDING HEARING SYSTEM

TECHNICAL FIELD

The invention relates to the field of hearing systems. A hearing system comprises at least one hearing device. Typically, a hearing system comprises, in addition, at least one additional device, which is operationally connected to said hearing device, e.g., another hearing device, a remote control or a remote microphone.

Under a hearing device, a device is understood, which is worn in or adjacent to an individual's ear with the object to improve the individual's acoustical perception. Such improvement may also be barring acoustic signals from being perceived in the sense of hearing protection for the individual. If the hearing device is tailored so as to improve the perception of a hearing impaired individual towards hearing perception of a "standard" individual, then we speak of a hearing-aid device. With respect to the application area, a hearing device may be applied behind the ear, in the ear, completely in the ear canal or may be implanted.

The invention relates to methods and apparatuses according to the opening clauses of the claims.

BACKGROUND OF THE INVENTION

Today's hearing systems and hearing devices often have numerous advanced features and provide for enormous capabilities and for a great flexibility. This can lead to some confusion of a user of the hearing system; e.g., because the hearing system does not behave the way the user would intuitively expect, and/or because the user has problems to properly operate the hearing system. The latter may be the case, because too many buttons are available on a remote control of the hearing system, or because one and the same button has multiple meanings at a hearing device of the hearing system. This is dissatisfactory for the user and may result in an inferior performance of the hearing system.

Typically, a user will call his hearing device professional, e.g., his hearing device fitter or audiologist, when seeking assistance concerning the hearing system. But, if the user has, by accident, changed parameters of the hearing system in such a way that speech intelligibility is very poor, the problem may occur, that the user is not even able to understand what his hearing device professional tries to tell him when being called for assistance.

From EP 1 628 503 A2, a hearing device is known, which is adapted to automatically requesting an establishment of a communication connection to a support provider. One event upon which such a communication connection is established, is, that the hearing system automatically detects a failure of the hearing device. Said EP 1 628 503 A2 does not address the case that the user feels a need for assistance.

From US 2003/0138109 A1, a hearing-aid device with embedded internet interface is known. This hearing-aid device determines the occurrence of abnormal operating conditions and automatically reports to a hearing aid acoustician, using said internet interface. Said US 2003/0138109 A1 does not address the case that the user feels a need for assistance.

SUMMARY OF THE INVENTION

Therefore, one object of the invention is to create a hearing system that does not have the disadvantages mentioned above, and a method for assisting a user of a hearing system shall be provided.

Another object of the invention is to provide for an increased user-friendliness of hearing systems.

Another object of the invention is to ease the use of a hearing system.

Another object of the invention is to make life easier for hearing device users.

Another object of the invention is to achieve an increased acceptance of hearing systems.

Further objects emerge from the description and embodiments below.

At least one of these objects is at least partially achieved by apparatuses and methods according to the patent claims.

According to the invention, the method for assisting a user of a hearing system comprises the steps of a) receiving a request for assistance from said user by means of a request-receiving unit of said hearing system; and b) automatically carrying out an assistance function upon step a).

According to the invention, the hearing system comprises at least one request-receiving unit for receiving requests for assistance from a user of said hearing system; and an assistance unit operationally connected to said request-receiving unit adapted to carrying out an assistance function providing assistance for said user.

Through this, the user of the hearing system is able to request assistance from the hearing system when he wants to be assisted by the hearing system. The user can decide by himself when he wants assistance and request it accordingly. Furthermore, the hearing system has an integrated assistance function for assisting the user.

Thus, the invention provides for an improved assistance for users of hearing systems.

In one embodiment, the method according to the invention and—more particularly—said assistance function assists the user in case that a failure of at least one component of the hearing system has occurred.

In one embodiment, the method according to the invention and—more particularly—said assistance function assists the user in case that said user has carried out manipulations which lead to an inappropriate status of the hearing system or of at least one device of said hearing system.

Preferably, the method according to the invention and—more particularly—said assistance function, assists the user in at least the above-mentioned two cases.

In one embodiment, step b) comprises the step of b1) carrying out an analysis of a current status of at least one device of said hearing system.

This can allow to identify the reason why said user requested assistance. With the knowledge about a probable reason for the user's assistance request, an attempt to counteract this reason can be undertaken.

Preferably, step b1) is carried out automatically upon step a).

Said current status of at least one device of said hearing system can comprise, e.g., at least one of the group comprising

- a status of a power supply, e.g., the available voltage;
- a status of a volume control, e.g., the current volume setting;
- a current feedback condition, e.g., a value indicative of the occurrence of the intensity of feedback loops from an output converter of the hearing system to an input converter of the hearing system;
- a status of at least one communication link within the hearing system;
- a current selection of input converters of the hearing system;

a current status of at least one input converter of the hearing system, e.g., with respect to its fundamental functionality, e.g., as indicated by an electrical resistance measured at said input converter;

a current selection of output converters of the hearing system;

a current status of at least one output converter of the hearing system, e.g., with respect to its fundamental functionality, e.g., as indicated by an electrical resistance measured at said output converter;

a current setting of at least one hearing parameter, in particular a current selection of a hearing program.

In one embodiment, step b1) comprises the step of b2) carrying out an analysis of at least one signal generated by an input converter unit of said hearing system.

Such an analysis can be very valuable in finding a reason why said user requested assistance. It can be possible to derive therefrom information about a possible faulty status of at least one component of the hearing system. But, more importantly, it can be possible to derive therefrom information about a current environment of the user, in particular about a current acoustic environment of the user. And said current environment should be reflected in current parameter settings of hearing system parameters. If, e.g., no electromagnetic input signals are detected, while a telephone coil has been selected as input converter, it is probable that the user does not understand the speech of people near him, which probably lead to the user's assistance request.

In particular, said analysis of said at least one signal generated by said input converter unit may be accomplished—at least in part—by means of a classifier. Classifiers are known in the art, in particular in the field of hearing-aid devices. A classifier allows to derive information about the acoustic environment surrounding the user, i.e., the acoustic environment in which the hearing system is located, by comparing said acoustic environment—as represented by said at least one signal generated by said input converter unit—to a set of predetermined acoustic environments, each described by one class of a set of predefined classes. Typical such classes represent environments, e.g., characterized as "music", "pure speech", "speech in noise". By means of the result of the classification, it can be possible to identify at least one hearing system parameter setting, in particular a currently selected hearing program, as the or a reason for the user's assistance request by judging the adequacy of said hearing system parameter setting in an acoustic environment as determined by the classification.

In one embodiment, step b1) comprises the step of c) generating a signal to be perceived by said user if no faulty or inappropriate current status of said at least one device of said hearing system has been detected in step b1).

By this signal, the user is informed about an important finding of said assistance function. Thereupon, the user can decide whether he wants to request further assistance, e.g., as described in step f) discussed below. Preferably, said signal is generated automatically.

In one embodiment, step b) comprises the step of d) attempting to correct said current status if a faulty or inappropriate current status has been detected in step b1).

Accordingly, said assistance function can—by itself—attempt to remedy a probable reason for the user's assistance request. E.g., if apparently inappropriate parameter settings have been detected, e.g., like sketched above, these parameters may be set to more appropriate settings.

Preferably, step d) is carried out automatically.

In one embodiment, step b) comprises the step of e) generating a signal to be perceived by said user indicating to said user that a specific action should be carry out.

Since the reason for the user's assistance request may in some cases not be remedied by the hearing system itself, said signal can be used for instructing the user how to help to overcome the problem. E.g., said signal can indicate that a battery should be replaced or that a wind protection should be removed or attached.

In one embodiment, step b) comprises the step of b2) carrying out an analysis of a current status of said hearing system;

e1) generating a signal to be perceived by said user indicating to said user that the hearing system is deemed to be in an operable state, if said analysis of said current status of said hearing system renders this result.

Accordingly, the user is informed about this important finding of said assistance function. Thereupon, the user can check whether he is content with the—possibly improved—status of the hearing system. If yes, the assistance function may terminate, with or rather without an indication thereof. If not, the user could invoke further steps, e.g., by issuing another assistance request.

In one embodiment, step b) comprises the step of f) establishing a communication link to a remote assistance provider.

Such a remote assistance provider typically is a hearing device professional, e.g., a hearing health care provider, a hearing device seller, an acoustician, a hearing device fitter, a hearing device specialist; possibly even an automated, preferably computer-based support system could function as a assistance provider. Preferably, step f) is carried out when it is detected that a faulty or inappropriate current status persists after step d) has been carried out and/or if another request for assistance from said user is received by means of said request-receiving unit after step e1) has been carried out. It is possible to define that at least one further condition has to be fulfilled for step f) being carried out.

Step f) can be carried out automatically upon such an event or after receiving an explicit confirmation by the user to carry out step f).

Preferably, step f) itself is carried out automatedly, i.e., without the user having to take action. This relieves the user from having to remember contact information of said remote assistance provider and from dealing with communication devices, which can be of great value, in particular since a high percentage of hearing system users is rather old and not fond of such burdens.

In one embodiment, said remote assistance provider is chosen from a multitude of persons. Preferably, this choice is made in dependence of information about the current status of the hearing system.

In one embodiment, step b) comprises the step of g) transmitting identification data to said remote assistance provider, which identify said user and/or at least one device of said hearing system.

This can enable the remote assistance provider to earlily access important data about the user and/or said hearing system. The remote assistance provider may this way welcome the user directly in his preferred language and/or load an appropriate fitting software or diagnostic software.

Preferably, said identification data are automatically transmitted when connecting to said remote assistance provider.

In one embodiment, step b) comprises the step of h) transmitting data to said remote assistance provider, which are related to a current status of at least one device of said hearing system.

This can be of great value for the remote assistance provider in trying to solve the user's problem.

Preferably, these data are automatically transmitted when connecting to said remote assistance provider.

In one embodiment, step b) comprises the step of i) resetting at least one parameter of at least one device of the hearing system to a default setting.

This is one way of attempting to remedy a reason for which the user made his assistance request. It is possible to reset all parameters—or at least all user-changeable parameters—to default settings.

In one embodiment, said request-receiving unit comprises at least one of the group comprising an input member operable by said user, in particular manipulable by said user;

an acoustical-to-electrical converter and a speech recognition unit operationally interconnected thereto.

In particular, said input member can be solely dedicated to invoke the initiation of said assistance function. An input member may be, e.g., a switch, a knob, a button. It is possible to provide more than one device of the hearing system with such an input member.

In one embodiment of the hearing system, said assistance unit is adapted to carrying out an analysis of a current status of at least one device of said hearing system.

In one embodiment of the hearing system, said assistance unit is adapted to carrying out an analysis of at least one signal generated by an input converter unit of said hearing system.

In one embodiment, the hearing system comprises a communication interface, wherein said assistance unit is adapted to attempting to establish a communication link to a remote assistance provider using said communication interface.

In one embodiment, the hearing system comprises a signalling unit adapted to generating a signal to be perceived by said user, which is operationally connected to said assistance unit.

Such a signal may comprise an acoustic signal, in particular a voice signal.

Such an signal may alternatively or additionally comprise an optical signal, e.g., a blinking or switched-on lamp, or writing or symbols on a display.

In one embodiment, the hearing system comprises an input member operable by said user, in particular manipulable by said user; and an acoustical-to-electrical converter and a speech recognition unit operationally interconnected thereto.

The advantages of the methods correspond to the advantages of corresponding hearing systems.

Further preferred embodiments and advantages emerge from the dependent claims and the figures.

BRIEF DESCRIPTION OF THE DRAWINGS

Below, the invention is described in more detail by means of examples and the included drawings. The figures show.

The reference symbols used in the figures and their meaning are summarized in the list of reference symbols. The described embodiments are meant as examples and shall not confine the invention.

DETAILED DESCRIPTION OF THE INVENTION

Figure 1:
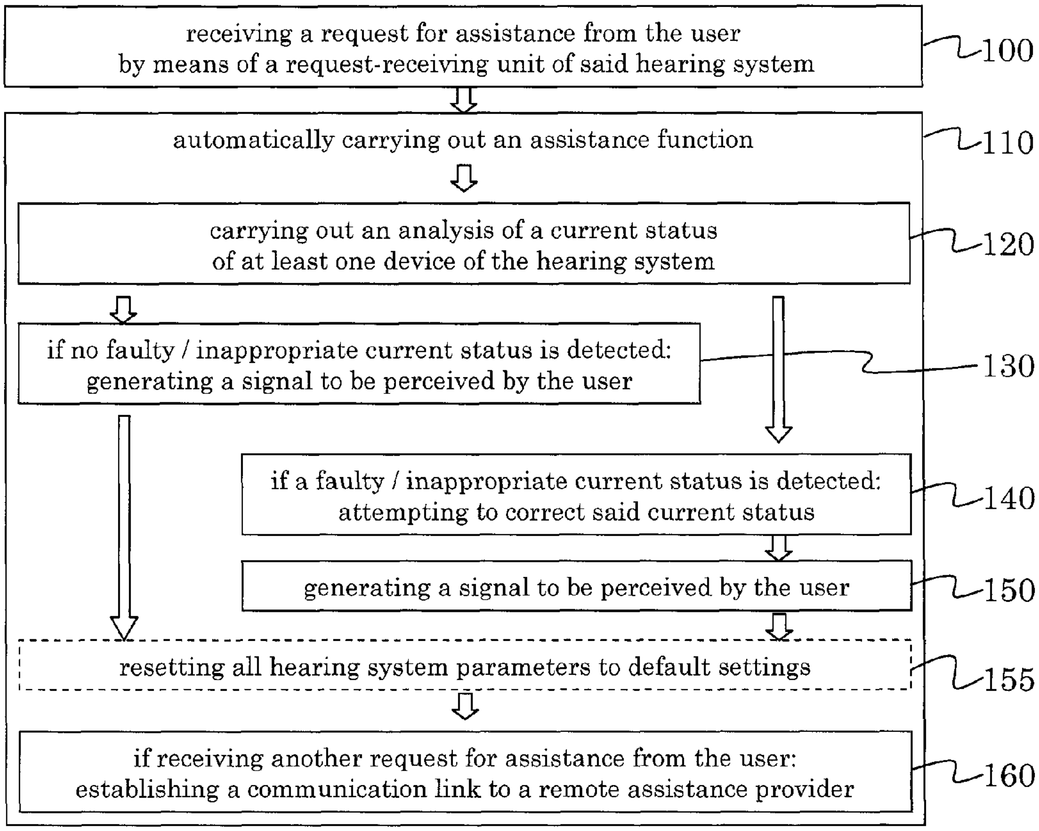
FIG. 1 a block diagram of a method according to the invention.

FIG. 1 is a block diagram of a method according to the invention. The method is a method for assisting a user of a hearing system.

The method is initiated by the user, typically in a situation, in which the user is unsatisfied with the performance of his hearing system. Typical reasons for such dissatisfaction are malfunction of a component of the hearing system or inappropriate choice of parameters of the hearing system. A simple example of the latter case is a situation, in which the user faces bad speech intelligibility, not being aware that a telephone coil is selected as an input transducer, instead of a microphone.

In step 100, the user's request for assistance is received by the hearing system. Thereupon, in step 110, an assistance function is carried out. The carrying-out of the assistance function comprises the steps 120 to 160.

In step 120, a current status of at least one device of the hearing system is analyzed. Typically, the current status of all devices of the hearing system is analyzed. Such a current status can describe, e.g., the voltage still available from a battery of the hearing system, the functionality of a communication link used between devices of the hearing system, the current volume setting of a hearing device of the hearing system.

If no faulty or inappropriate current status is detected in step 120, i.e.,—staying with the examples given above—if the available voltage is still sufficient and if the communication link functions properly and if an adequate volume setting is selected, in step 130 a signal to be perceived by the user is generated. This shall indicate to the user that the hearing system is deemed to be in operable condition.

If, on the other hand, a faulty or inappropriate current status is detected in step 120, i.e.,—staying with the examples given above—if the available voltage is too low and/or the communication link is not functioning properly and/or an inadequate volume setting (e.g., far too low volume) is selected, in step 140 the hearing system will—as a part of the assistance function—try to remedy the detected problem(s). After step 140, step 150 can be foreseen, in which a signal to be perceived by the user is generated. If the attempt for correction is deemed successful, this signal shall indicate to the user that the hearing system is deemed to be in operable condition. If the attempt for correction is deemed to have failed, this signal could indicate this assumption and/or it could indicate to the user that the user is requested to take some action, e.g., replace the faulty battery, since such actions cannot be taken by the hearing system itself (not indicated in FIG. 1).

Finally, rather as a possible last way for achieving an improvement of the unsatisfactory current status, the hearing system can establish a communication link to a remote assistance provider (step 160). In FIG. 1, step 160 is carried out if another request for assistance from the user is received by the hearing system. It is meaningful in this case to distinguish between requests intended for initiating the carrying out of the assistance function (step 110) and requests intended for initiating the carrying out of the assistance function (step 110), in particular if only one input member is available.

In order to distinguish between requests intended for initiating the carrying out of the assistance function (step 110) and requests intended for initiating the carrying out of the assistance function (step 110), e.g., the time between two subsequent requests can be used as a measure: if a request is issued within a prescribable time (e.g., of the order of a minute) after step 150 or step 155, it will be considered said other request (of step 160), and otherwise step 110 will be carried out. Or, the requests can be distinguished by the way they come about: e.g., double-clicking a button for said other request of step 160 instead of single-clicking the same button for a request of step 100 or vice versa, or long pressing of a button for said other request of step 160 instead of shortly pressing the same button for a request of step 100 or vice versa, or recognizing, which of at least two different input members has been operated.

Upon said other request, said provider, such as the user's acoustician or hearing device fitter, may then assist the user with his problems, e.g., by informing the user what to do and/or by diagnosing the current status and applying changes to the hearing system via the same communication link used before or via another link. It is also possible that the remote assistance provider invites the user to his location in order to provide appropriate assistance.

An optional step 155 is introduced between steps 150 and 160, in which all hearing system parameters are reset to default settings. These default setting will typically be individual to each user 4. This step 155 should overcome any problems that occur due to an inappropriate handling of hearing system parameters by the user 4. Preferably, it is selectable by the user, whether or not step 155 shall be carried out.

Various further scenarios of steps performed in carrying out said assistance function and of their logical sequence are possible and can easily be thought of.

A method as sketched above can be implemented in a straight-forward manner in today's digital hearing devices and hearing systems. Corresponding routines and functions can be realized in software and integrated in existing hearing devices and hearing systems using state-of-the-art processors and controllers and other components.

Figure 2:
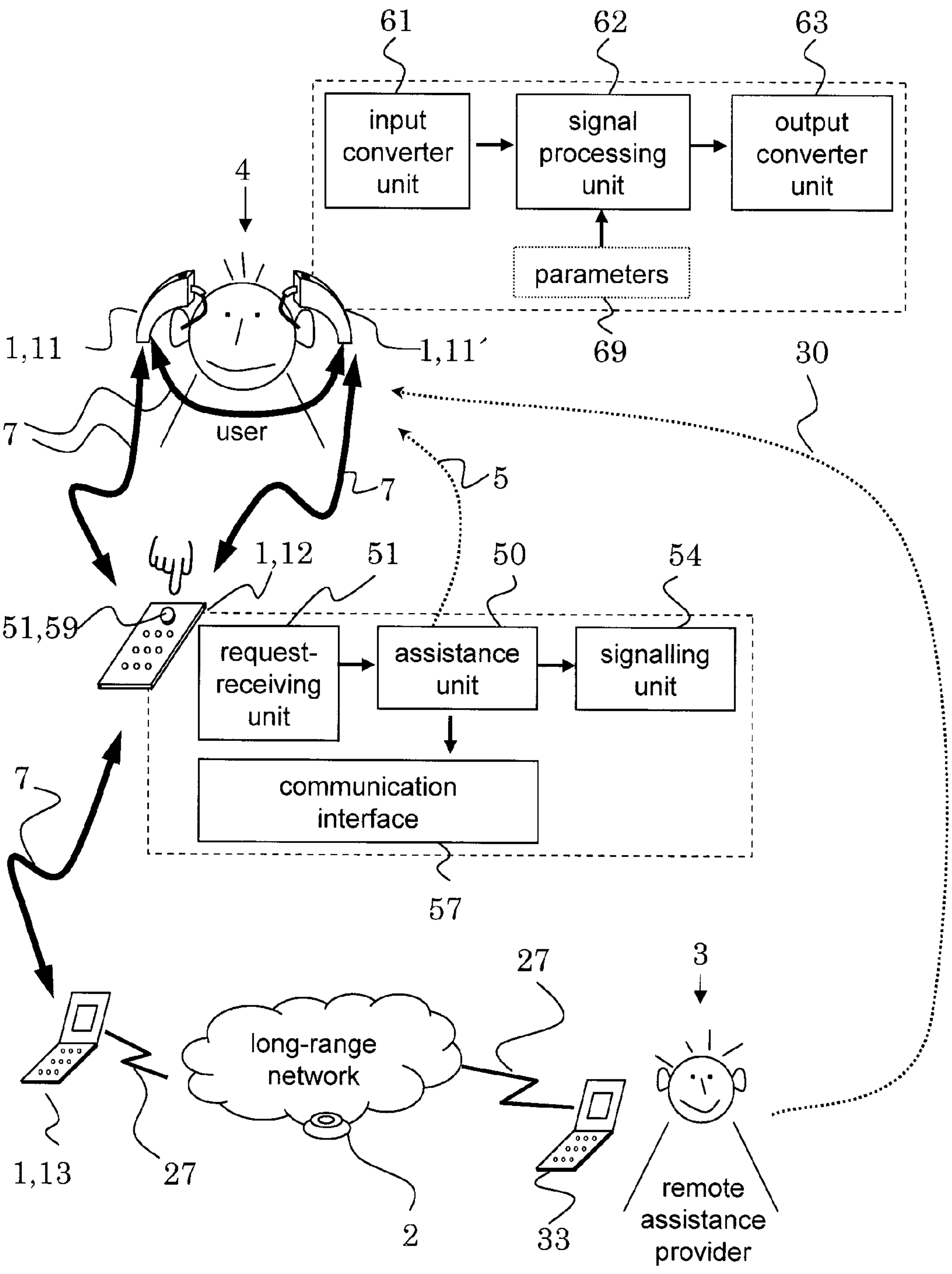
FIG. 2 an illustration of a hearing system according to the invention.

FIG. 2 illustrates a hearing system 1 according to the invention. The hearing system 1 comprises four devices 11,11',12,13: two hearing devices 11,11', a remote control 12 and a mobile phone 13, which are operationally connected in a wire-bound or preferably wireless fashion via short-range communication connections 7, e.g., according to the bluetooth standard, indicated by thick curved arrows. The user of the hearing system 1 is labelled by reference symbol 4.

The remote control 12 comprises a request-receiving unit 51, an assistance unit 50, a signalling unit 54 and a communication interface 57.

Each such unit can be foreseen—alternatively or additionally—in other, in particular in all devices 11,11',12,13 of the hearing system 1.

The request-receiving unit 51 comprises an input member 59, e.g., a button. Manipulating this member 59 will initiate the execution of an assistance function, e.g., an assistance function as discussed in conjunction with FIG. 1. Preferably, said input member 59 is dedicated solely to the purpose of receiving input from the user 4 in case that the user is in need of assistance. Viewed from a slightly different point of view, said input member 59 is preferably dedicated solely to the purpose of causing the request-receiving unit 51 to provide the assistance unit 50 with a signal.

Instead of an input member 59 or in addition thereto, said request-receiving unit 51 can comprise an acoustical-to-electrical converter and a speech recognition unit operationally interconnected thereto. This allows the user 4 to request assistance by speaking, e.g., by saying "Now I need help with my hearing system", whereupon the input member 59 would transmit a signal to assistance unit 50 for initiating the assistance function.

The assistance unit 50 provides—upon the user's request—assistance for the user, as indicated by the arrow labelled 5. For this purpose, assistance unit 50 is operationally connected not only with request-receiving unit 51, but at least also with communication interface 57 and signalling unit 54.

Communication interface 57 allows the assistance unit 50 to communicate with other devices of the hearing system 1, e.g., for checking the status of components of the hearing system, like converters, power supplies and others, and for checking hearing system parameters, like volume settings, hearing programs and others. In case of hearing device 11', some components of this hearing device 11' are explicitly shown in FIG. 2, namely an input converter unit 61, e.g., a set of microphones, a signal processing unit 62, e.g., a digital signal processor, and an output converter 63, e.g., a loudspeaker. Furthermore a memory containing parameters 69 is indicated in FIG. 2. Using said communication interface 57, the status of said components 61,62,63 of device 11' and the appropriateness or suitability of the parameters 69 of device 11' can be checked by the assistance unit located in the remote control 12.

The signalling unit 54 is used for generating signals to be perceived by the user 4 if requested so by the assistance unit 50. These signals may be, e.g., acoustical signals and/or optical signals. Accordingly, signalling unit 54 may comprise, e.g., a loudspeaker, a light source, a display. The signalling unit 54 is preferably capable of generating several different signals, at least some of which carry a different message to the user. For example, the user may be informed by a signal that the assistance unit 50 deems the current status of the hearing system 1 to be in reasonable and operable condition, or the user may be requested to change a battery by another signal or combination of signals.

In some cases, it may be advisable to provide for assistance by a remote assistance provider 3, e.g., by a hearing device fitter. This may be the case, e.g., when the user 4 is not content with the performance of the hearing system 1, in particular if the assistance unit 50 deems the status of the hearing system to be in good order. For example, user 4 is informed by a signal generated by signalling unit 54, that the status of the hearing system is deemed to be in good order, but the user 4 is still not content and requests (again) assistance, e.g., by pressing (again) the button 59; or user 4 double-clicks button 59. This way or another way, the establishment of a communication link to a remote assistance provider 3 can be requested.

Such a communication link 27 may, e.g., be established like shown in FIG. 2, wherein mobile phone 13, which is a device of hearing system 1, connects via a long-range communication network, e.g., GSM, CDMA, UMTS, GPRS, EDGE, to another communication device 33 associated with said remote assistance provider 3. Remote assistance provider 3 can make use of the same communication path and try to provide user 4 with assistance 30, but possibly, it is necessary that user 4 visits remote assistance provider 3 for solving all his hearing system problems. Therefore, a separate dotted line is used to symbolize assistance 30.

Preferably, identification data are—preferably automatically—transmitted to the remote assistance provider 3, which identify the user 4 and/or at least one device 11,11',12,13 of the hearing system 1. This way, the user 3 and/or said at least one device can easily and unambiguously be identified, even in an automated fashion, which allows the remote assistance provider to prepare himself. Furthermore, data, which are related to a current status of at least one device of said hearing system, can be transmitted to the remote assistance provider 3. This can help the remote assistance provider 3 to find the reason why user 4 requested assistance.

The invention provides for a method for providing help to the hearing system user 4, wherein the user 4 can very easily initiate said method. Unsatisfactory hearing performances can quickly and easily be overcome, reaching an improved performance of the hearing system 1.

LIST OF REFERENCE SYMBOLS

1 hearing device system
2 long-range communication network
3 remote assistance provider
4 user
5 assistance
7 short-range communication connection, short-range communication link
11,11' hearing device
12 remote control
13 mobile communication device, mobile phone
27 long-range communication connection
30 assistance
33 communication device, mobile communication device, mobile phone
50 assistance unit
51 request-receiving unit
54 signalling unit
57 communication interface
61 input converter unit, input converter
62 signal processing unit
63 output converter unit, output converter
69 parameters
100 . . . 160 steps

The invention claimed is:

1. Method for assisting a user of a hearing system, comprising the steps of a) receiving a request for assistance with the hearing system from said user by means of a request-receiving unit of said hearing system; and b) automatically carrying out an assistance function upon step a) wherein step b) comprises the step of f) establishing a communication link to a remote assistance provider.

2. The method according to claim 1, wherein step b) comprises the step of b1) carrying out an analysis of a current status of at least one device of said hearing system.

3. The method according to claim 2, wherein step b1) comprises the step of b2) carrying out an analysis of at least one signal generated by an input converter unit of said hearing system.

4. The method according to claim 2, wherein step b1) comprises the step of c) generating a signal to be perceived by said user if no faulty or inappropriate current status of said at least one device of said hearing system has been detected in step b1).

5. The method according to claim 2, wherein step b) comprises the step of d) attempting to correct said current status if a faulty or inappropriate current status has been detected in step b1).

6. The method according to claim 5, wherein step b) comprises the step of f) establishing a communication link to a remote assistance provider; and wherein step f) is carried out automatically if the following condition is met:

it is detected that a faulty or inappropriate current status persists after step d) has been carried out.

7. The method according to claim 1, wherein step b) comprises the step of e) generating a signal to be perceived by said user indicating to said user that a specific action should be carried out.

8. The method according to claim 1, wherein step b) comprises the step of b1') carrying out an analysis of a current status of said hearing system; and e1) generating a signal to be perceived by said user indicating to said user that the hearing system is deemed to be in an operable state, if said analysis of said current status of said hearing system renders this result.

9. The method according to claim 8, wherein step b) comprises the step of f) establishing a communication link to a remote assistance provider; and wherein step f) is carried out automatically if at least the following condition is met:

another request for assistance from said user is received by means of said request-receiving unit after step e1) has been carried out.

10. The method according to claim 1, wherein step b) comprises the step of g) transmitting identification data to said remote assistance provider, wherein said data identify said user and/or at least one device of said hearing system.

11. The method according to claim 1, wherein step b) comprises the step of h) transmitting data to said remote assistance provider, wherein said data are related to a current status of at least one device of said hearing system.

12. The method according to claim 1, wherein step b) comprises the step of i) resetting at least one parameter of at least one device of the hearing system to a default setting.

13. The method according to claim 1, wherein said request-receiving unit comprises at least one selected from the group consisting of:

an input member operable by said user;

an acoustical-to-electrical converter and a speech recognition unit operationally interconnected thereto.

14. Hearing system comprising at least one request-receiving unit for receiving requests for assistance with the hearing system from a user of said hearing system;

an assistance unit operationally connected to said request-receiving unit and adapted to carry out an assistance function providing assistance for said user; and a communication interface, wherein said assistance unit is adapted to attempt to establish a communication link to a remote assistance provider using said communication interface.

15. The hearing system according to claim 14, wherein said assistance unit is adapted to carry out an analysis of a current status of at least one device of said hearing system.

16. The hearing system according to claim 14, wherein said assistance unit is adapted to carry out an analysis of at least one signal generated by an input converter unit of said hearing system.

17. The hearing system according to claim 15, wherein said assistance unit is adapted to attempt to correct said current status if a faulty or inappropriate current status has been detected.

18. The hearing system according to claim 14, wherein said assistance unit is adapted to reset at least one parameter of at least one device of the hearing system to a default setting.

19. The hearing system according to claim 14, further comprising a signalling unit adapted to generate a signal to be perceived by said user, wherein said signaling unit is operationally connected to said assistance unit.

20. The hearing system according to claim 14, wherein said request-receiving unit comprises at least one selected from the group consisting of:

an input member operable by said user;

an acoustical-to-electrical converter and a speech recognition unit operationally interconnected thereto.

* * * * *